United States Patent Office 3,580,918
Patented May 25, 1971

---

3,580,918
METHOD FOR THE PREPARATION OF AMINOALKYL FUMARATES
Frizian Nikolaevich Bodnarjuk and Mikhail Alexeevich Korshunov, Yaroslavl, U.S.S.R., assignors to Nauchno-Issledovatelsky Institut Monomerov Dlya Sinteticheskogo, Yaroslavl, U.S.S.R.
No Drawing. Filed Sept. 3, 1968, Ser. No. 757,122
Int. Cl. C07c *101/00*
U.S. Cl. 260—294.3      3 Claims

ABSTRACT OF THE DISCLOSURE

Aminoalkyl fumarates having the following formula:

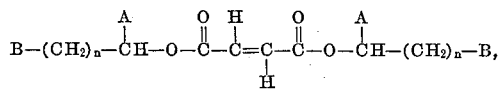

wherein:

B is selected from the group consisting of tertiary aliphatic amino groups containing from 2 to 12 carbon atoms and piperidino;
A is H, $CH_3$ or $CH_2$—B, and
$n$ is an integer of 1 to 2, are produced by reacting maleic anhydride and amino alcohols having the general formula

at reflux temperature in the presence of an esterification catalyst and an inert solvent while bubbling nitrogen through the reaction mixture and continuously distilling off the water formed in the course of the reaction in the form of an azeotrope with the solvent. The aminoalkyl fumarates may be copolymerized with other vinyl type monomers to incorporate polar amino groups into polymer molecules to improve the characteristics of colorability, adhesion to various materials, resistance to temperature shocks and antistatic properties.

---

This invention relates to methods of manufacturing aminoalkyl fumarates and to novel aminoalkyl fumarates. More particularly, the invention relates to methods of manufacturing aminoalkyl fumarates having the following general formula

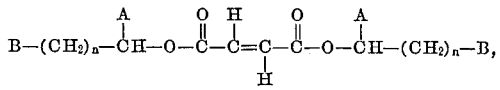

wherein:

B represents tertiary aliphatic or heterocyclic amino groups containing from 2 to 12 carbon atoms;
A stands for H, $CH_3$ or $CH_2$—B, and
$n$ is an integer of 1 to 2

Aminoalkyl fumarates may be copolymerized with other vinyl-type monomers with a view to incorporating polar amino groups into polymer molecules. The incorporation of amino groups into polymeric materials gives rise to or improves such desirable characteristics as colorability, adhesion to various materials, resistance to temperature shocks, and antistatic properties.

Known are methods for the preparation of two monomers of the above type, viz, bis-(2-dimethylaminoethyl) fumarate and bis-(2-diethylaminoethyl) fumarate. To prepare the former ester, a mixture of fumaryl dichloride and dimethylaminaoethanol hydrochloride in anhydrous chlorobenzene is subjected to prolonged refluxing. The resultant dihydrochloride of diamino ester is neutralized with a potash solution and distilled in vacuo. Bis-(2-dimethylaminoethyl) fumarate is obtained in a yield of up to 50% of the theoretical. In a similar manner, from fumaryl dichloride and diethylaminoethanol in acetonitrile solution there is obtained bis-(2-diethylaminoethyl) fumarate in a yield of 69%. The above method suffers from serious disadvantages of requiring the use of scarcely available fumaryl dichloride, of involving the formation of strongly corroding hydrogen chloride, of providing but a low yield of the sought-for esters, and of being a multistage and lengthy procedure.

It is also known to prepare bis-(2-diethylaminoethyl) fumarate by the transesterification of dimethyl fumarate with 2-diethylaminoethanol in the presence of metallic sodium or aluminum isopropylate as catalyst, the yield of the product compound being 30–60% of the theoretical.

This prior art method also has a number of disadvantages, of which mention should be made of low yields, the necessity of employing a substantial excess of the starting amino alcohol, the necessity of mechanical stirring of the reaction mixture, and a significant dwell time of the reaction mixture under high temperature conditions and in the presence of metallic sodium which results in the decomposition and resinification of the starting materials and the sought-for diamino ester. The bis-(diethylaminoethyl) fumarate thus obtained is reported to be of inadequate purity even after repeated distillation.

It is an object of the present invention to provide a simple and economical method for the manufacture of aminoalkyl fumarates which lends itself to commercialization.

This and other objects have been accomplished, according to the present invention, by carrying out the esterification of maleic anhydride with amino alcohols having the general formula

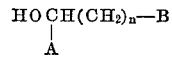

wherein

B represents tertiary aliphatic or heterocyclic amino groups containing from 2 to 12 carbon atoms;
A stands for H, $CH_3$ or $CH_2$—B, and
$n$ is an integer of 1 to 2, in the presence of esterification catalysts and in an inert organic solvent medium, the water formed in the course of the reaction being simultaneously removed in the form of an azeotrope with the solvent.

The esterification catalysts preferably comprise ferric sulfate, aluminum sulfate, or a mixture thereof, or mixtures of said catalysts with alkalies, while as the inert solvents use is made of benzene or homologues thereof, such as toluene and xylene.

It is expedient to carry out the esterification process while bubbling an inert gas, e.g., nitrogen, through the reaction mixture.

The present invention is also directed to novel compositions of matter produced by the method, according to the invention, viz:

Bis-(2-diethylaminoisopropyl) fumarate
Bis-(2-diallylaminoisopropyl) fumarate
Di-/2-(N-piperidyl)-ethyl/fumarate
Bis-/1,3-bis-(dimethylamino)-isopropyl/fumarate
Bis-/1,3-bis-(diethylamino)-isopropyl/fumarate.

Esterification is effected in the following manner. Into a reaction vessel fitted with a thermometer, a bubbler for feeding an inert gas, and a reflux condenser with a water trap are charged amino alcohol, maleic anhydride, and a solvent for azeotropic distillation of the water formed, and an esterification catalyst.

The reaction mixture is refluxed until the aqueous layer ceases to separate in the water trap. It is good practice to carry out the esterification while bubbling nitrogen or some other inert gas through the reaction mixture.

Upon reaction termination, the reaction mixture is washed with an aqueous solution of alkali metal carbonate or hydroxide in order to remove the acid ester (monoester) present as an impurity or, in some cases, to recover the unconverted amino alcohol, followed by distilling off in vacuo the solvent containing some water. The reaction product comprises an appropriate aminoalkyl fumarate obtained in a yield of 85–95% of the theoretical; the ester is a colored oily liquid.

In order to attain a higher degree of ester purity, the monomers are subjected to vacuum distillation. Aminoalkyl fumarates have, for the most part, very high boiling points, so that distillation even in high vacuum and under a nitrogen blanket results in a marked decomposition and resinification of the product being distilled.

The purification of aminoalkyl fumarates, synthesized by following the present procedure, can generally be avoided, insofar as the monomers isolated without resorting to vacuum distillation display physical and chemical constants and have the ultimate chemical composition that are practically identical to those of vacuum-distilled specimens.

The esterification catalysts are selected from the group consisting of ferric sulfate, $Fe_2(SO_4)_3 \cdot 9H_2O$, aluminum sulfate, $Al_2(SO_4)_3 \cdot 18H_2O$, mixtures thereof, or mixtures of, said sulfates with alkalies. It is likewise feasible to employ other catalysts, such as p-toluenesulfonic acid, or sodium bisulfate, which are, however, less effective.

For a better understanding of the present invention, the following examples are presented by way of illustration.

EXAMPLE 1

Bis-(2-diethylaminoethyl) fumarate

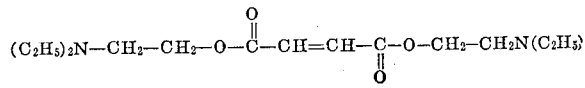

(a) In a flask, furnished with a thermometer, a bubbler for feeding nitrogen and extending nearly to the flask bottom, and a reflux condenser with a water trap, are placed 258 g. of 2-diethylaminoethanol, 98 g. of maleic anhydride, 40 ml. of m-xylene, and a mixture comprising 6 ml. of a 20% solution of aluminum sulfate and 1.5 ml. of a 50% solution of sodium hydroxide.

Dry, oxygen-free nitrogen is bubbled through the reaction mixture heated on an oil bath, the water that separates in the trap being removed continuously. During 5.5 hours, the amount of distilled off water equals 34 ml., and the temperature of the reaction mixture rises from 156 to 186° C. within this period of time.

Potentiometric titration data show the distilled off water to contain 11 g. of the starting 2-diethylaminoethanol, so that the overall amount of the water removed in the course of the reaction comprises 18 ml. of the water formed and 5 ml. of the water incorporated into the reaction mixture with the catalyst.

Then the reaction mixture is cooled down, washed with a 10% solution of sodium hydroxide and thereafter washed with a concentrated sodium chloride solution in order to remove the traces of the alkali. Upon xylene removal by distillation in vacuo and the filtration of the residue, there is obtained 290, 3 g. (92.4% of the theoretical amount) of a transparent, light yellow liquid; $n_D^{20}$ 1.4665.

Analysis.—Found (percent): N, 9.15; 9.22; Calcd. for $C_{16}H_{30}N_2O$ (percent): N, 8.91.

Distillation of the reaction product in vacuo yields 221 g. (70.4% of the theoretical amount) of bis-(2-diethylaminoethyl) fumarate in the form of a light yellow liquid; B.P. 151–155° C./1 mm. Hg; $n_D^{20}$ 1.4665; $d_4$ 0.9930; $MR_D$ 87.54; $MR_{calcd.}$ 86.81.

Analysis.—Found (percent): N, 8.78; 8.92. Calcd. percent): N, 8.91.

Dimethiodide: B.P. 193–194° C. (recrystl. from ethanol).

(b) In a flask, furnished with a stirrer, a thermometer, and a reflux condenser with a water trap, are placed 19.6 g. of maleic anhydride, 61.5 g. of 2-dimethylaminoethanol, 50 ml. of toluene, and 8 g. of ferric sulfate,

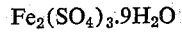

The reaction mixture is refluxed, while being stirred, until the aqueous layer ceases to separate in the water trap. The amount of water distilled off during 12 hours equals 3.4 ml. The reaction mixture is washed twice with a saturated solution of potash and distilled in vacuo.

The reaction yields 35.7 g. (56.8% of the theoretical amount) of a straw colored liquid, B.P. 152–155° C./1 mm. Hg; $n_D^{20}$ 1.4665.

EXAMPLE 2

Bis-(2-diethylaminoisopropyl) fumarate

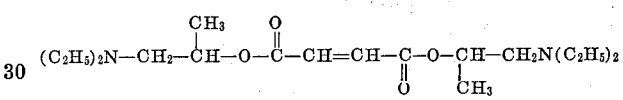

52.4 g. of 2-diethylaminoisopropanol and 19.6 g. of maleic anhydride in the presence of 20 ml. of m-xylene and the catalyst consisting of a mixture of 1 ml. of 50% sodium hydroxide solution and 4 ml. of 20% aluminum sulfate solution yield, under the conditions disclosed in Example 1, 62.4 g. of the monomer (91.2% of the theoretical amount); $n_D^{20}$ 1.4610. Upon distillation in vacuo, there is obtained 52.1 g. (76.2% of the theoretical amount) of the pure diester; B.P. 146–148° C./0.6 mm. Hg; $n_D^{20}$ 1.4592; $d_4^{20}$ 0.9697; $MR_D$ 96.61; $MR_{calcd.}$ 96.05.

Analysis.—Found (percent): N, 7.85; 7.93. Calcd. for $C_{18}H_{34}N_2O_4$ (percent): N, 8.18.

EXAMPLE 3

Bis-(2-diallylaminoisopropyl) fumarate

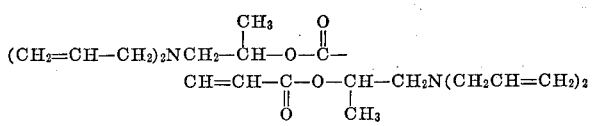

In the reaction vessel described in Example 1a is placed a mixture comprising 9.8 g. of maleic anhydride, 34.2 g. of diallylaminoisopropanol, 15 ml. of o-xylene, 2 ml. of a 20% aluminum sulfate solution and 0.5 ml. of a 50% sodium hydroxide solution, and a stream of dry, oxygen-free nitrogen is bubbled through the reaction mixture being heated. Within 2.5 hours there collects 2.9 ml. of water in a Dean and Stark apparatus and the temperature of the reaction mixture rises from 163 to 180° C. Upon reaction termination, the reaction product is washed with a 10% solution of sodium hydroxide and then twice with cold water, followed by stripping off in vacuum o-xylene and water traces. Bis-(2-diallylaminoisopropyl) fumarate in the form of a light brown liquid is obtained in a yield of 30.2 g. (77.3% of the theoretical amount); $n_D^{20}$ 1.4948.

Analysis.—Found (percent): N, 7.08; 6.91. Calcd. for $C_{23}H_{34}N_2O_4$ (percent): N, 7.17.

EXAMPLE 4

Di-[2-(N-piperidyl)-ethyl]fumarate

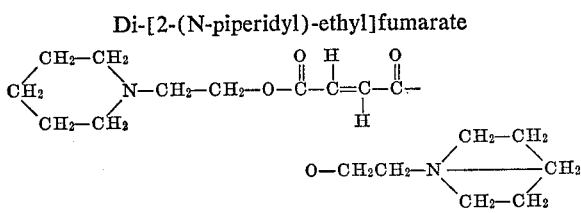

24.6 g. of maleic anhydride, 64.5 g. of 2-(N-piperidyl) ethanol, 30 ml. of o-xylene, 4 ml. of a 20% aluminum sulfate solution and 1 ml. of a 50% sodium hydroxide solution are reacted under the conditions disclosed in Example 1a. Within 2.5 hours there collects 7.7 ml. of water in the water trap, and the temperature of the reaction mixture rises from 135 to 185° C. Upon cooling, the reaction mixture is washed with a 10% alkali solution and then with water. After stripping off the xylene, there is obtained 70.4 g. (83.1% of the theoretical amount) of di-[2-(N-piperidyl)-ethyl] fumarate in the form of a light brown liquid; $n_D^{20}$ 1.5030.

*Analysis.*—Found (percent): N, 8.53; 8.66. Calcd. for $C_{18}H_{30}N_2O_4$ (percent): N, 8.28.

Distillation of the reaction product in vacuo yields 41.72 g. (49.4% of the theoretical amount) of a yellowish liquid; B.P. 189–192° C./0.5 mm. Hg; $n_D^{20}$ 1.4998.

In the persence of an excess of methyl iodide in an alcoholic solution, the reaction product yields the dimethiodide; B.P. 179–180° C.

*Analysis.*—Found (percent): N, 4.37; 4.59. Calcd. for $C_{20}H_{26}I_2N_2O_4$ (percent): N, 4.50.

EXAMPLE 5

Bis-[1,3-bis-(dimethylamino)-isopropyl]

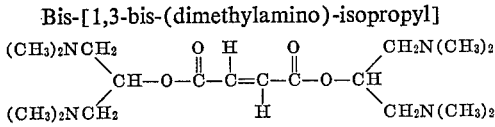

A mixture comprising 65.8 g. of 1,3-bis-(dimethylamino)-isopropanol, 19.6 g. of maleic anhydride and 20 ml. of o-xylene is heated in the presence of 1 ml. of a 50% NaOH solution and 4 ml. of a 20% aluminum sulfate solution. The reaction is carried out in the apparatus described in Example 1a. The reaction mixture is maintained at a temperature of 155 to 167° C. for 5 hours and during this period there separates 6.5 ml. of water. The reaction mixture is allowed to cool, and thereafter filtered and distilled in vacuo. Distillation yields 12.1 g. of unconverted amino alcohol and 34.8 g. (46.8% of the theoretical amount) of the diester in the form of a light yellow oil; B.P. 162–165° C./0.6 mm. Hg; $n_D^{20}$ 1.4680.

*Analysis.*—Found (percent): N, 15.02; 14.87. Calcd. for $C_{18}H_{36}N_4O_4$ (percent): N, 15.04.

Tetramethiodide.—To a solution of 1 ml. of the fumarate in 10 ml. of ethanol is added 3 ml. of methyl iodide. On standing, there falls out a white precipitate which is insoluble in alcohol. The precipitate is washed thrice with boiling alcohol and dried; M.P. 215° C. (decomp.).

*Analysis.*—Found (percent): N, 5.75; 6.11. Calcd. for $C_{22}H_{48}I_4N_4O_4$ (percent): N, 5.96.

EXAMPLE 6

Bis-[1,3-bis-(diethylamino)-isopropyl]fumarate

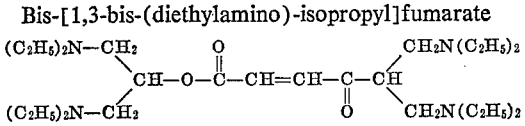

In the apparatus described in Example 1a are placed 19.6 g. of maleic anhydride, 81 g. of 1,3-bis-(diethylamino)-isopropanol, 20 ml. of m-xylene, 1 ml. of a 50% sodium hydroxide solution and 4 ml. of a 20% aluminum sulfate solution. The reaction mixture is heated while bubbling nitrogen therethrough and distilling off the water formed. Within 4.5 hours there separates 6.5 ml. of water, and the temperature of the reaction mixture rises from 160 to 180° C.

The reaction mixture is washed with an alkaline solution and water, filtered and subjected to vacuum distillation in order to remove the xylene and then the unconverted diamino alcohol (22.3 g.; B.P. 98–100° C./8 mm. Hg; $n_D^{20}$ 1.4470). The reaction yields 64.2 g. (66.3% of the theoretical amount) of a brown liquid; $n_D^{20}$ 1.4750.

*Analysis.*—Found (percent): N, 10.92; 11.13. Calcd. for $C_{26}H_{52}N_4O_4$ (percent): N, 1.56.

We claim:

1. A method for the preparation of aminoalkyl fumarates having the general formula

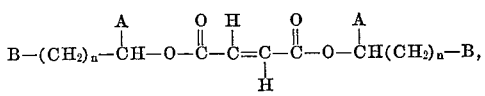

wherein:

B is selected from the group consisting of tertiary aliphatic amino groups containing from 2 to 12 carbon atoms and piperidino;

A is H, $CH_3$ or $CH_2$—B, and n is an integer of 1 to 2, which comprises reacting at reflux temperature amino alcohols having the general formula

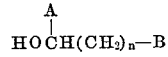

with maleic anhydride in the presence of an esterification catalyst and an inert solvent, said esterification catalyst being selected from the group consisting of ferric sulfate, aluminum sulfate, a mixture thereof, or a mixture of said sulfates with alkalies, said inert solvent being selected from the group consisting of benzene, toluene, and xylene, bubbling nitrogen through the reaction mixture, continuously distilling off the water formed in the course of the reaction in the form of an azeotrope wtih the solvent, and separating the reaction product.

2. Bis-/1,3-bis-(dimethylamino)-isopropyl/fumarate.

3. Bis-/1,3-bis-(diethylamino)-isopropyl/fumarate.

References Cited

UNITED STATES PATENTS

| 2,723,967 | 11/1955 | Thomas | 260—78.5 |
| 2,987,517 | 6/1961 | Martin et al. | 260—293.4 |

FOREIGN PATENTS

| 580,392 | 9/1946 | England | 260—294.3 |
| 766,534 | 1/1957 | England | 260—240 |

OTHER REFERENCES

Chemical Abstracts I, vol. 44, cols. 1031 to 1033 (1950) (abstracts of Phillips and Fusco et al.).

Chemical Abstracts II, vol. 59, col. 6529 (1963) (abstract of Ordelt).

Chemical Abstracts III, vol. 65, col. 806 (1966) (abstract of Szmercsanyi et al.)

JOHN D. RANDOLPH, Primary Examiner

U.S. Cl. X.R.

260—78.5, 240, 482